United States Patent
Pritchard et al.

(10) Patent No.: US 11,880,304 B2
(45) Date of Patent: Jan. 23, 2024

(54) CACHE MANAGEMENT USING CACHE SCOPE DESIGNATION

(71) Applicant: INTERNATIONAL BUSINESS MACHINES CORPORATION, Armonk, NY (US)

(72) Inventors: Taylor J Pritchard, Austin, TX (US); Aaron Tsai, Hyde Park, NY (US); Richard Joseph Branciforte, Austin, TX (US); Ashraf ElSharif, Austin, TX (US); Gregory William Alexander, Pflugerville, TX (US); Deanna Postles Dunn Berger, Hyde Park, NY (US); Michael Fee, Cold Spring, NY (US)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 17/664,722

(22) Filed: May 24, 2022

(65) Prior Publication Data

US 2023/0385195 A1    Nov. 30, 2023

(51) Int. Cl.
G06F 12/0811    (2016.01)

(52) U.S. Cl.
CPC .. *G06F 12/0811* (2013.01); *G06F 2212/1021* (2013.01)

(58) Field of Classification Search
None
See application file for complete search history.

(56) References Cited

U.S. PATENT DOCUMENTS

| 9,298,466 | B2 | 3/2016 | Buyuktosunoglu |
| 9,569,265 | B2 | 2/2017 | Chandel |
| 10,521,351 | B2 | 12/2019 | Giamei |
| 10,572,387 | B2 | 2/2020 | Coe |
| 10,956,337 | B2 | 3/2021 | Giamei |
| 11,048,506 | B2 | 6/2021 | Ramani |

(Continued)

OTHER PUBLICATIONS

Gracioli, et al., "On the Influence of Shared Memory Contention in Real-Time Multicore Applications." Published Nov. 2014 by IEEE. 6 pages. In 2014 Brazilian Symposium on Computing Systems Engineering (pp. 25-30).

(Continued)

*Primary Examiner* — Kaushikkumar M Patel
(74) *Attorney, Agent, or Firm* — Matthew Zehrer (57) ABSTRACT

To facilitate an efficient processing of contended cache lines, a cache controller that is associated with a requestor receives a fetch request for data from the requestor. The fetch request is associated with a cache scope designation. If the data is in a high-level cache (e.g., L1 cache) associated with the requestor, the cache controller returns the requested data to the requestor. If the data is not in the high-level cache or if the data is not within the cache pool identified by the cache scope of search designation, and/or if obtaining the data is contentious, the controller returns a cache miss, undeliverable data, and request done instruction to the requestor. Such scheme allows or permits address contention events when the requestor deems such events are necessary and/or when important. As such, address contention events, performance, latencies, increased executions times, inefficient use of resources, may be diminished.

20 Claims, 5 Drawing Sheets

(56) References Cited

U.S. PATENT DOCUMENTS

2011/0320774 A1    12/2011  Jacobi
2018/0024930 A1*  1/2018  Gschwind ........... G06F 12/0862
                                                             711/137
2022/0107901 A1*  4/2022  Ishii .................... G06F 12/0862

OTHER PUBLICATIONS

IBM®, "Announcing IBM z16: Real-time AI for Transaction Processing at Scale and Industry's First Quantum-Safe System." IBM United States Software Announcement, dated Apr. 5, 2022, 7 pages, Evidence of Grace Period Use or Sale. https://newsroom.ibm.com/2022-04-05-Announcing-IBM-z16-Real-time-AI-for-Transaction-Processing-at-Scale-and-Industrys-First-Quantum-Safe-System.

Zhang, et al., "Exploiting commutativity to reduce the cost of updates to shared data in cache-coherent systems." Published Dec. 2015 by ACM. 14 pages. In Proceedings of the 48th International Symposium on Microarchitecture—MICRO-48 (2015). https://doi.org/10.1145/2830772.2830774.

\* cited by examiner

CACHE MANAGEMENT USING CACHE SCOPE DESIGNATION

BACKGROUND

Various embodiments of the present application are generally related to cache management in a multiprocessing (MP) system.

Modern processor chips continue to hold increased numbers of central processing unit (CPU) cores. As a result, the number of CPU cores connected to one or more cache memories continue to also increase to support growing workload capacity demand. The increasing number of CPUs cooperating to process workloads puts a significant burden on cache hierarchy design. Multiple CPU cores requesting data from the same memory address may lead to address contention. These address contention events lead to inefficient computing and latency issues.

SUMMARY

Various embodiments of the present invention are presented. In an embodiment, a computer-implemented method is presented. In another embodiment, a system is presented. In yet another embodiment, a computer program product is presented. Such presented embodiments include receiving, by a cache-controller, a fetch request for data of a cache line from a requestor. The fetch request includes a cache scope space. The presented embodiments further include unsuccessfully searching, by the cache-controller, for the data within a high-level cache that is local to the requestor. The presented embodiments further include determining, by the cache-controller, a cache scope designation associated with the fetch request. The presented embodiments further include determining, by the cache-controller, that the cache scope designation specifies a lower-level cache relative to the high-level cache. The presented embodiments further include, in response to determining the cache scope designation specifies the lower-level cache, searching, by the cache-controller, for the data within a next-level cache that is at least one cache-level lower from the high-level cache. The presented embodiments further include, when the data is not within the next-level cache, determining, by the cache-controller, whether the next-level cache equals the lower-level cache. The presented embodiments further include, when the next-level cache equals the lower-level cache, transmitting, by the cache-controller, a cache-miss message to the requestor.

These and other embodiments, features, aspects, and advantages will become better understood with reference to the following description, appended claims, and accompanying drawings.

BRIEF DESCRIPTION OF THE DRAWINGS

In accordance with common practice, the various features illustrated in the drawings may not be drawn to scale. Accordingly, the dimensions of the various features may be arbitrarily expanded or reduced for clarity. In addition, some of the drawings may not depict all the components of a given system, method, or device. Finally, like reference numerals may be used to denote like features throughout the specification and Figures.

DETAILED DESCRIPTION

Applications executed on modern multiprocessor (MP) system hardware necessitate data sharing. Periodically, multiple processing cores request data from the same address of a shared memory storage. These address contention events diminish MP performance by introducing latencies, increased executions times, and inefficient use of resources. Various mechanisms have been used to manage address contention events including locks, semaphores, mutexes, and queues. Conventionally, developers employ these mechanisms to design cache hierarchies that manage address contention events through various techniques including request serialization and request reordering. However, these approaches introduce their own system performance inefficiencies in the form of increased controller utilization, inefficient use of bus/interface bandwidth, and introduction of additional operational latency.

In a traditional MP system architecture, processor core requests are arbitrated and presented to a memory architecture that serializes data returns. The processor core's request moves through the architecture and initiates a cache-access and associated directory lookup, checks resource availability, and checks if any other core controls the cache line. If the cache line has no controller, the current core assumes control and sets a lock to prevent other cores from accessing the cache line data. This lock remains active until the request has been satisfied. As a subsequent core requests the cache line data, its associated controller performs an address compare to determine if another core currently controls the cache line and is currently accessing the cache line data or if another core is ahead in line for control of the cache line. These controllers essentially form a serialized linked list that forms an order of cache line control and corresponding order that cache line data is accessed.

During the time that the current core assumes control of the cache line, each secondary requester is locked out of the data until the current controller's request has been satisfied. The secondary requesters hold the requested cache line addresses in a register and perform address compares to determine if the address remains locked. The secondary requestors remain on hold until the cache line control is released. In these conventional systems, the secondary requestors only transmit and receive data in relation to their own requests. Additionally, the shared controller is unaware which cores are requesting the data and the operation types of the requests. This decentralized method of managing address contention events increases operational latencies and reduces efficient resource utilization.

One or more embodiments of the present invention address such above-described shortcoming(s) by providing a controller management scheme to manage fetching data from cache(s) by utilizing a cache scope designation. To facilitate an efficient processing of contended cache lines, a controller that is associated with a requestor, such as a processor, core, thread, or the like, receives a fetch request for data from the requestor. The fetch request includes a cache scope designation that generally identifies the scope, sets the bounds, etc., of one or more caches in which the controller seeks the data. If the data is in the local cache(s) associated with the requestor, the controller returns the requested data to the requestor. If the data is not in the local cache(s) associated with the requestor and if obtaining the data is contentious, the controller determines whether the data is located within the cache(s) designated by the cache scope designation. If the data is located within the cache(s) designated by the cache scope designation, the controller obtains requisite authority over the data and returns the requested data from the appropriate cache. If the data is not located within the cache(s) designated by the cache scope designation, the controller returns a cache miss, undeliverable data, and request done instruction to the requestor. Such scheme allows or permits address contention events when the requestor deems such events are necessary (i.e., by setting a wide cache scope designation). As such, address contention events, MP performance, latencies, increased executions times, inefficient use of resources, etc. may be diminished.

Figure 1:
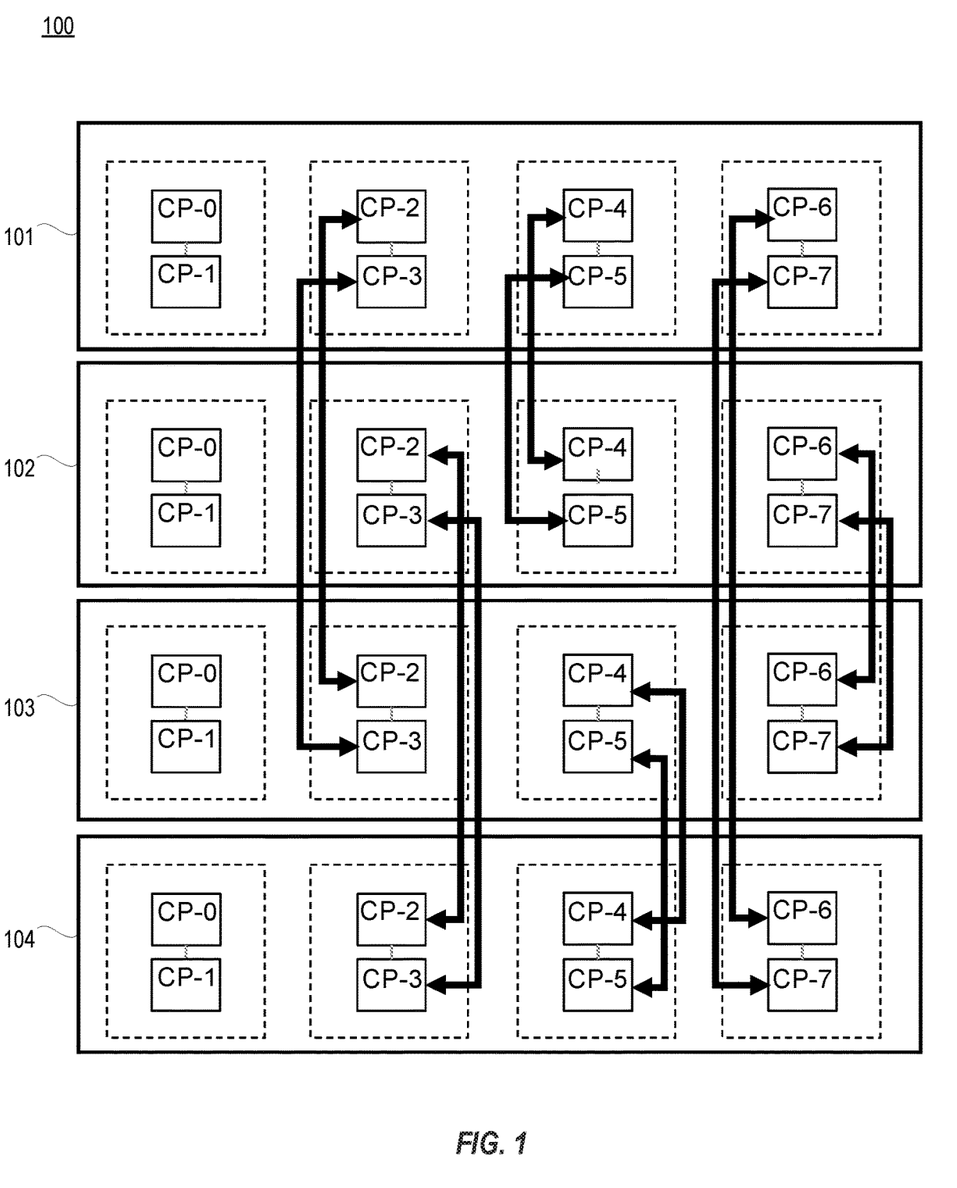
FIG. 1 depicts a block diagram of processing drawers for use in implementing one or more embodiments of the present invention.

FIG. 1 depicts a multiprocessor (MP) computer system 100 of four interconnected processing drawers 101, 102, 103, 104 in accordance with one or more embodiments of the present invention. Although FIG. 1 depicts a system 100 of four interconnected processing drawers, it should be appreciated that in other embodiments a MP computer system could include any number of processing drawers.

Processing drawers 101, 102, 103, 104 may include a plurality of processing chips, such as central processors (CPs). Two or more processing chips may be logically grouped and/or physically connected within a cluster. For example, as depicted, each processing drawer 101, 102, 103, 104 may include central processors CP-0, CP-1, CP-2, CP-3, CP-4, CP-5, CP-6, and CP-7. Each of the processing chips, as exemplarily depicted in FIG. 2, may communicate with one another within the same drawer via one or more internal buses. Each processing chip pair CP-0 and CP-1, CP-2 and CP-3, CP-4 and CP-5, and CP-6 and CP-7 may be logically grouped and/or physically connected within a different cluster.

Processing drawers 101, 102, 103, 104 may communicate with one another by communicatively connecting one or more processing chip(s) of a first processing drawer with a dedicated or exclusive one or more processing chip(s) of a second processing drawer. For example, as depicted, CP-2 and CP-3 of processing drawer 101 may be communicatively connected with CP-2 and CP-3 of processing drawer 103, CP-4 and CP-5 of processing drawer 101 may be communicatively connected with CP-4 and CP-5 of processing drawer 102, CP-6 and CP-7 of processing drawer 101 may be communicatively connected with CP-6 and CP-7 of processing drawer 104, etc. Processing drawers 101, 102, 103, 104 may communicate with one another via one or more external buses that connect each processing drawer with another processing drawer, etc. The inter and intra processing drawer communication may be achieved by receiving and transmitting signals via a combination of such internal and external busses.

Figure 3:
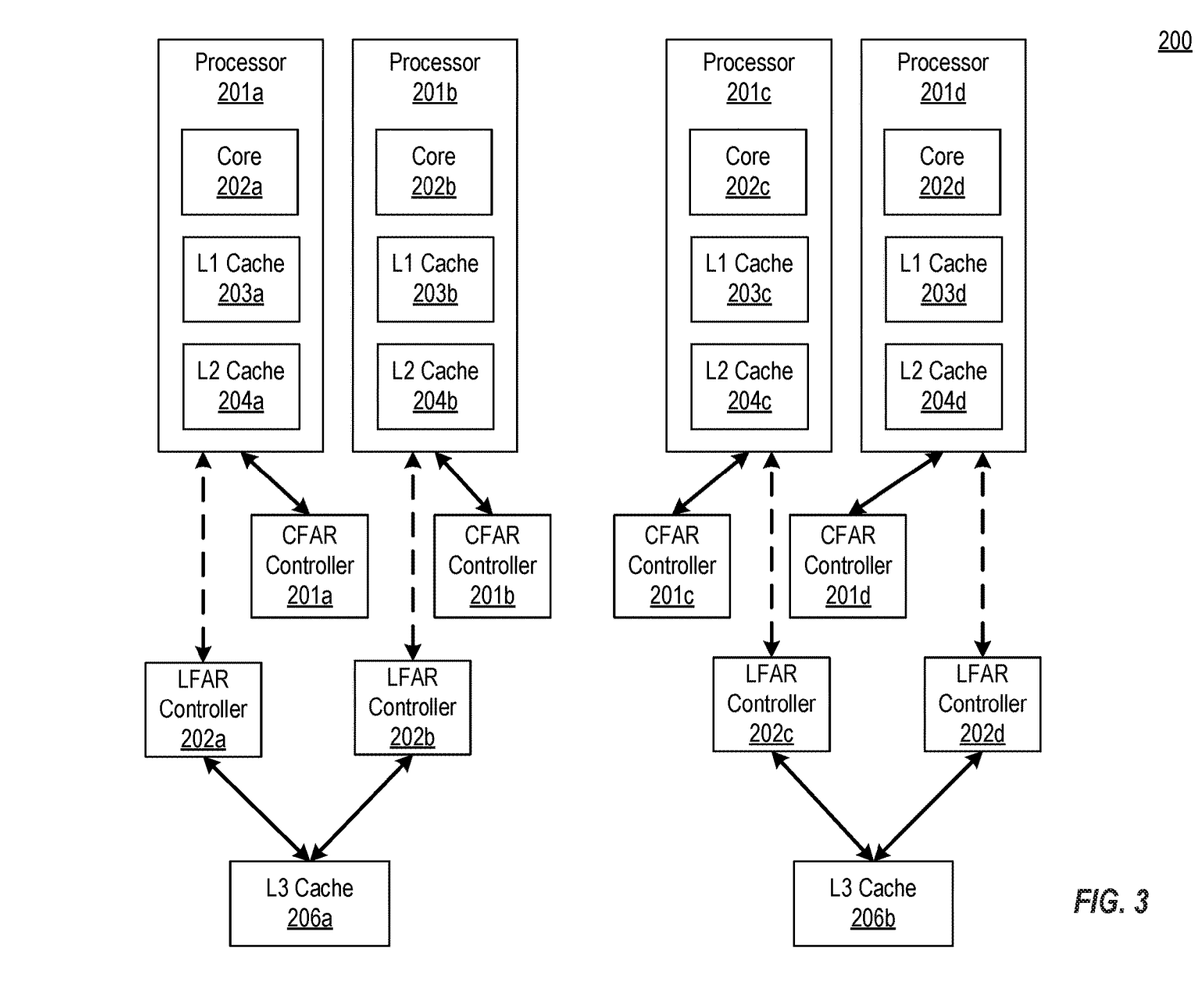
FIG. 3 depicts a block diagram of a computer system, according to one or more embodiments of the invention.

Referring to FIG. 3 a block diagram illustrating an exemplary multiprocessor (MP) computer system 300 is shown. As illustrated, four processors 201a, 201b, 201c, 201d are shown, that respectively include one or more cores 202, a level 1 (L1) cache 203, and a level 2 (L2) cache 204. Each processor 201a, 201b, 201c is configured to be in operative communication with one or more associated data controllers. As described above, the data controllers may be configured to access data from the level 2 (L2) cache 204, the level 3 (L3) cache 206 and the level 4 (L4) cache (not shown).

In an embodiment, the L2 cache level is comprised of a group of distinct hardware cache components, each associated with one core in the same processor. In another embodiment, the L2 cache level may be comprised of virtualized or logical hardware cache components. Because of the virtualized nature of this L2 cache level, the logical or virtual grouping of L2 cache effectively forms a lower-level cache (e.g., the virtual L2 cache level effectively forms a L3 cache) that may be shared by different cores, processors, etc.

Similarly, in an embodiment, L3 cache 206 is a hardware cache, each associated with multiple processors 201 of the same CP chip. In another embodiment, the L3 cache level may be comprised of virtualized or logical hardware cache components. Because of the virtualized nature of this L3 cache level, the logical or virtual grouping of L3 cache effectively forms a lower-level cache (e.g., forms a virtual L4 cache) that may be shared by different cores, processors, processing drawers, etc.

Controller 201a, 201b, 201c, 201d is in operable communication with processor 201a, 201b, 201c, 201d, respectively. The controllers, in some embodiments of the present invention, may be core fetch address register (CFAR) controllers 201a, 201b, 201c, 201d and/or may be local fetch address register (LFAR) controller(s) 202a, 202b, 202c, 202d, that each hold the memory address(es) of the requested data.

The CFAR controllers 201a, 201b, 201c, 201d and/or LFAR controller(s) 202a, 202b, 202c, 202d operate to manage requests entirely within or associated with one associated respective processor 201a, 201b, 201c, 201d. If there is a hit in the respective L1 cache 203 or L2 cache 203, LFAR controller(s) 202a, 202b, 202c, 202d manages the return of the data from L1 cache 203 or L2 cache 204 to the requesting associated processor(s) 201a, 201b, 201c, 201d. If there is a miss in the respective L1 cache 203 or L2 cache 203, the appropriate CFAR controller(s) 201a, 201b, 201c, 201d may manage the return of the data from L3 cache 206, L4 cache (not shown), main memory (not shown), etc. to the requesting associated processor(s) 201a, 201b, 201c, 201d.

It should be appreciated that although CFAR and LFAR controllers are referenced, any type of controllers would suffice, in which multiple different controller types may be configured to be solely utilized by a dedicated core and dedicated local or on-board cache (e.g., L1 cache 203, L2 cache 204, etc.) and in which may be in operable communication with non-local or off-chip cache, such L3 cache 206, L4 cache (not shown), main memory (not shown), that may be utilized by multiple cores, processors, or the like.

In a conventional system, when a requesting processor issues a data request to a non-local cache, such as L3 cache, the address is loaded onto an associated requesting controller. Address compare circuitry compares the address loaded onto the requesting controller with any addresses of requested data of other processors.

In the conventional system, if the address of the requested data does not match any address that is currently being requested by the other processors, the requesting controller is granted control of the associated cache line. If the address of the requested data does match any address that is currently being requested by the other processors, the requesting controller remains in a hold position until the other associated current controller is released of control of the associated cache line.

In the conventional system, any subsequent controller requesting the data will in turn also remain on hold until the cache line is available. The requesting controller, associated with the issuing processor, is eventually granted control, and retrieves the cache line data and transmits the data to it its associated issuing processor. The subsequent controllers are granted control and receive the data in a serialized fashion based upon a known or predetermined algorithm (e.g., upon the order that associated requests were received, upon the opposite order that requests were received, etc.). This results in serialized control of the requests by the controllers and a serialized management of data returns.

Figure 4:
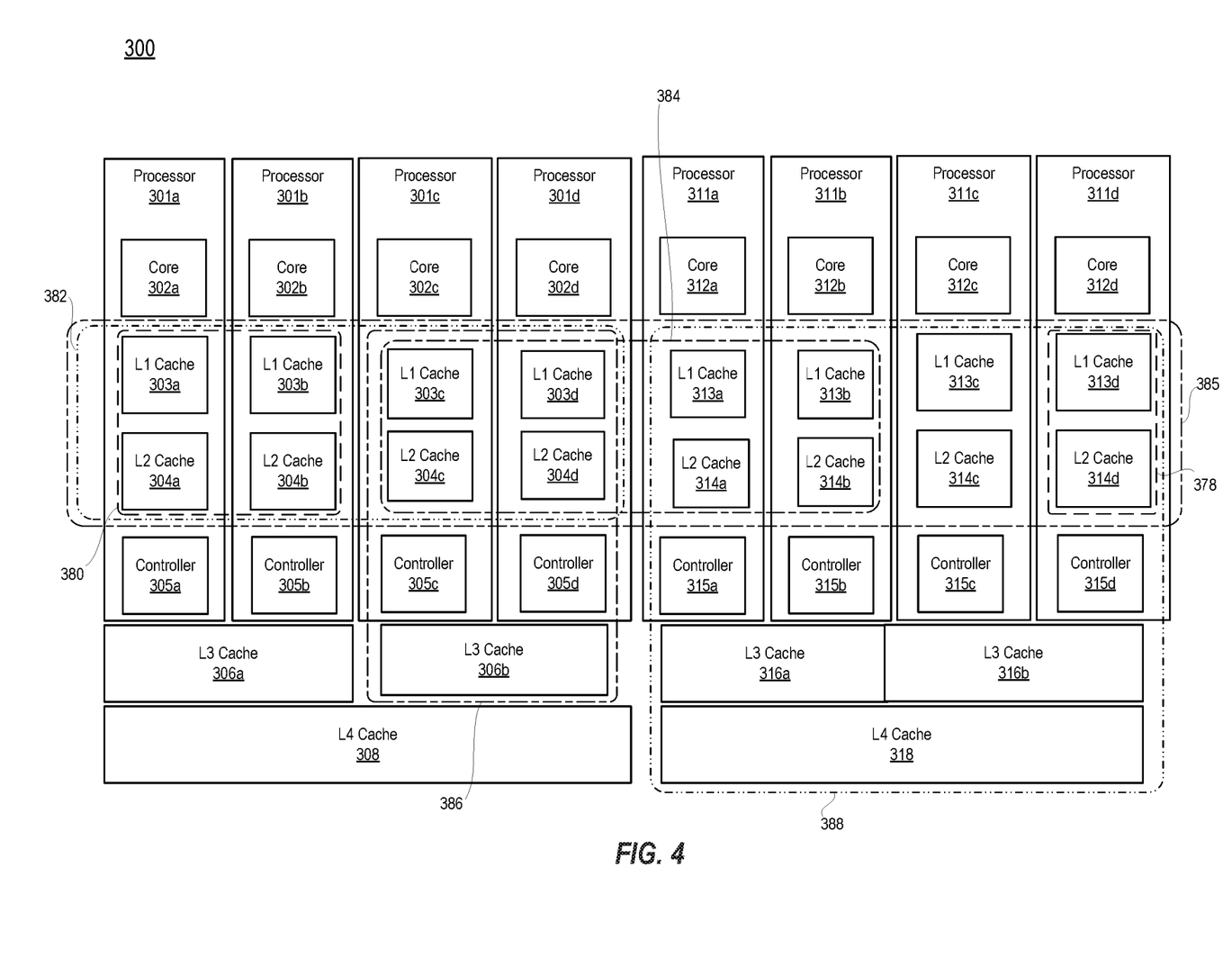
FIG. 4 depicts a block diagram of a computer system, according to one or more embodiments of the invention.

Referring to FIG. 4, exemplary multiprocessor (MP) computer system 300 is shown. MP computer system 300 includes multiple processing clusters 370, 372, 374, and 376. Each processing cluster 370, 372, 374, and 376 includes a pair of processing chips. For example, as depicted, processing cluster 370 includes processor 301a, 301b; processing cluster 372 includes processor 301c, 301d; processing cluster 374 includes processor 311a, 311b; and processing cluster 376 includes processor 311c, 311d.

Figure 2:
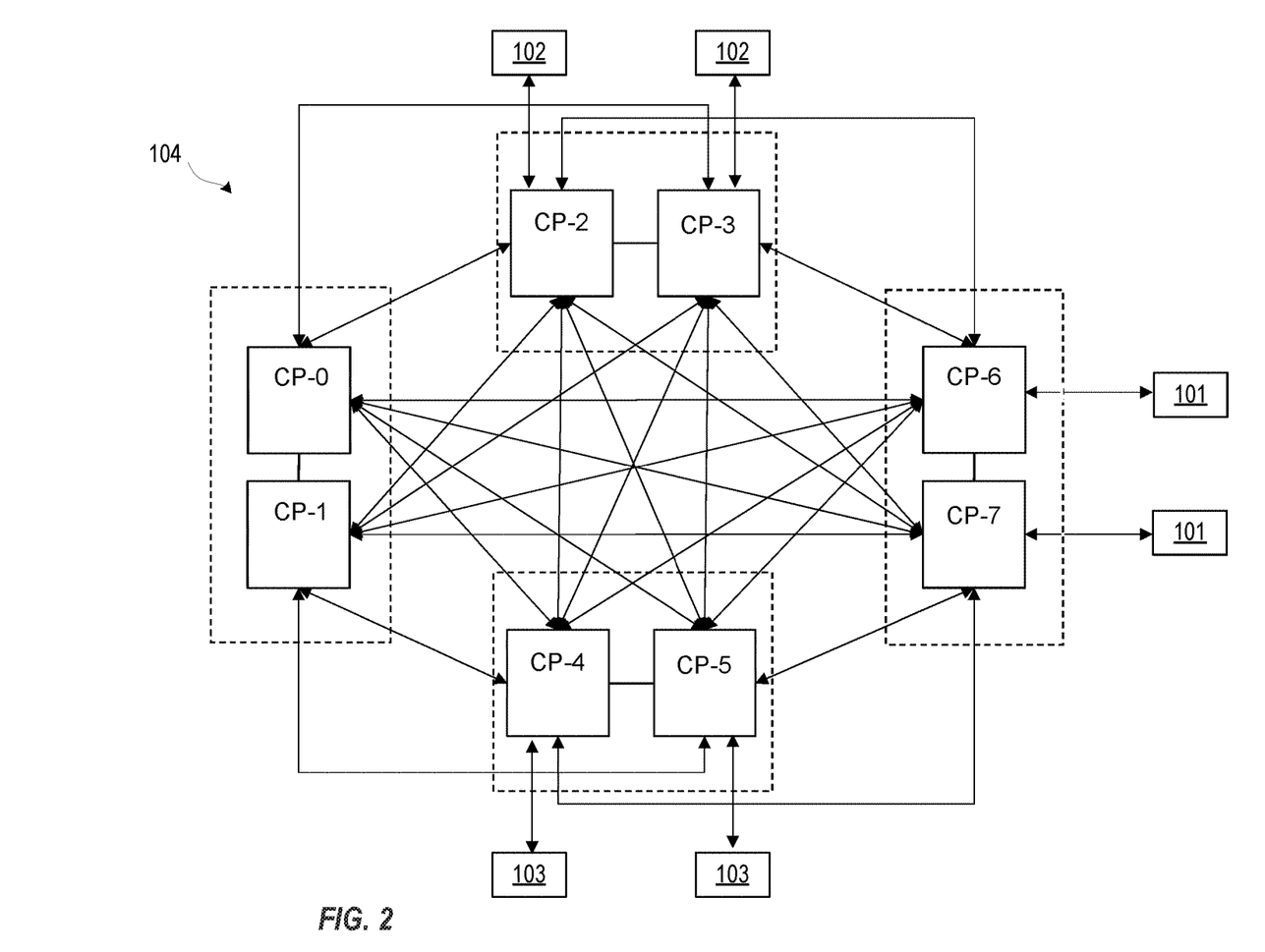
FIG. 2 depicts a block diagram of a processing drawer for use in implementing one or more embodiments of the present invention.

In an implementation, clusters 370, 372, 374, and 376 are in the same processing drawer, such as processing drawer 104 shown in FIG. 2. In an alternative implementation, clusters 370, 372 are in a first processing drawer and clusters 374 and 376 are located in a second different processing drawer. In this implementation, one of the clusters 370 or 372 may be communicatively connected to one of the clusters 374 or 376 in the other processing drawer. For example, processing cluster 370, which includes processor 301a (e.g., CP-4 of processing drawer 104) and processor 301b (e.g., CP-5 processing drawer 104), may be communicatively connected to processing cluster 374, which includes processor 311a (e.g., CP-4 of processing drawer 103) and processor 311b (e.g., CP-5 of processing drawer 103). Although two processors are depicted within a cluster, it should be appreciated that each cluster may include any number of processors to execute its desired functionality.

Each processor includes one or more cores 302, 312, respectively. For example, each depicted processing chip may include a single processor having a single core. Each core is configured to be in operative communication with a non-shared, on-board, local, or the like, cache, such as L1 cache 303, 313, respectively and/or L2 cache 304, 314, respectively, and a controller, such as controller 305, 315, respectively. The local cache (e.g., L1 cache 303, 313, L2 cache 304, 314) is dedicated to a single or unique core 302, 312, respectively. In other words, the local cache is not shared or utilized by different cores.

Each controller 305, 315 is configured to access data in its associated local cache and to access data in non-local cache, such as a shared cache (e.g. L3 cache 306, 316, respectively, L4 cache 308, 318, respectively), main memory (not shown), or the like. The non-local cache may include physical memory storage that is internal to the one or more processing drawer(s) included in the MP computer system 300. Main memory is sometimes referred to as random access memory (RAM) or primary storage. The main memory may provide storage for program instructions and data for execution and fetching during data processing. Program instructions and data contained on external sources, for example, discs, flash drives, and USB sticks may be copied onto main memory prior to execution by one or more of the cores.

The L1 cache may be the smallest cache and is located closest to the core. In some embodiments, the L1 cache is split between a data cache and an instructions cache. The L2 cache may be larger than the L1 cache and located the second closest to the core. In some embodiments, the L1 cache and L2 cache can employ an inclusive design and store duplicated data from one cache onto the other cache. In other embodiments, the L1 cache and L2 cache employ an exclusive design and not share any data. The L3 cache may provide memory storage for multiple processing cores. The L4 cache may provide memory storage for an even larger number of processing cores. The L3 cache and the L4 cache may be assigned to a predetermined set of processor cores.

In the depicted example, processor 301a includes core 302a, controller 305a, local L1 cache 303a, and local L2 cache 304a. Core 302a is configured to be in operative communication with local L1 cache 303a, local L2 cache 304a, by way of controller 305a. Core 302a is configured to be in operative communication with non-local L3 cache 306a and non-local L4 cache 308 by way of controller 305a. Local L1 cache 303a and local L2 cache 304a may be dedicated to and solely utilized by core 302a. In other words, no other cores may directly utilize local L1 cache 303a and local L2 cache 304a. Controller 305a may be dedicated to and solely utilized by core 302a, local L1 cache 303a, and local L2 cache 304a.

Further in the depicted example, processor 301b includes core 302b, controller 305b, local L1 cache 303b, and local L2 cache 304b. Core 302b is configured to be in operative communication with local L1 cache 303b, local L2 cache 304b, by way of controller 305b. Core 302b is configured to be in operative communication with non-local L3 cache 306a and non-local L4 cache 308 by way of controller 305b. Local L1 cache 303b and local L2 cache 304b may be dedicated to and solely utilized by core 302b. In other words, no other cores may directly utilize local L1 cache 303b and local L2 cache 304b. Controller 305b may be dedicated to and solely utilized by core 302b, local L1 cache 303b, and local L2 cache 304b.

Further in the depicted example, processor 301c includes core 302c, controller 305c, local L1 cache 303c, and local L2 cache 304c. Core 302c is configured to be in operative communication with local L1 cache 303c, local L2 cache 304c, by way of controller 305c. Core 302c is configured to be in operative communication with non-local L3 cache 306b and non-local L4 cache 308 by way of controller 305c. Local L1 cache 303c and local L2 cache 304c may be dedicated to and solely utilized by core 302c. In other words, no other cores may directly utilize local L1 cache 303c and local L2 cache 304c. Controller 305c may be dedicated to and solely utilized by core 302c, local L1 cache 303c, and local L2 cache 304c.

Further in the depicted example, processor 301d includes core 302d, controller 305d, local L1 cache 303d, and local L2 cache 304d. Core 302d is configured to be in operative communication with local L1 cache 303d, local L2 cache 304d, by way of controller 305d. Core 302d is configured to be in operative communication with non-local L3 cache 306b and non-local L4 cache 308 by way of controller 305d. Local L1 cache 303d and local L2 cache 304d may be dedicated to and solely utilized by core 302d. In other words, no other cores may directly utilize local L1 cache 303d and local L2 cache 304d. Controller 305d may be dedicated to and solely utilized by core 302d, local L1 cache 303d, and local L2 cache 304d.

Further in the depicted example, processor 311a includes core 312a, controller 315a, local L1 cache 313a, and local L2 cache 314a. Core 312a is configured to be in operative communication with local L1 cache 313a, local L2 cache 314a, by way of controller 315a. Core 312a is configured to be in operative communication with non-local L3 cache 316a and non-local L4 cache 318 by way of controller 315a. Local L1 cache 313a and local L2 cache 314a may be dedicated to and solely utilized by core 312a. In other words, no other cores may directly utilize local L1 cache 313a and local L2 cache 314a. Controller 315a may be dedicated to and solely utilized by core 312a, local L1 cache 313a, and local L2 cache 314a.

Further in the depicted example, processor 311b includes core 312b, controller 315b, local L1 cache 313b, and local L2 cache 314b. Core 312b is configured to be in operative communication with local L1 cache 313b, local L2 cache 314b, by way of controller 315b. Core 312b is configured to be in operative communication with non-local L3 cache 316a and non-local L4 cache 318 by way of controller 315b. Local L1 cache 313b and local L2 cache 314b may be dedicated to and solely utilized by core 312b. In other words, no other cores may directly utilize local L1 cache 313b and local L2 cache 314b. Controller 315b may be dedicated to and solely utilized by core 312b, local L1 cache 313b, and local L2 cache 314b.

Further in the depicted example, processor 311c includes core 312c, controller 315c, local L1 cache 313c, and local L2 cache 314c. Core 312c is configured to be in operative communication with local L1 cache 313c, local L2 cache 314c, by way of controller 315c. Core 312c is configured to be in operative communication with non-local L3 cache 316b and non-local L4 cache 318 by way of controller 315c. Local L1 cache 313c and local L2 cache 314c may be dedicated to and solely utilized by core 312c. In other words, no other cores may directly utilize local L1 cache 313c and local L2 cache 314c. Controller 315c may be dedicated to and solely utilized by core 312c, local L1 cache 313c, and local L2 cache 314c.

Further in the depicted example, processor 311d includes core 312d, controller 315d, local L1 cache 313d, and local L2 cache 314d. Core 312d is configured to be in operative communication with local L1 cache 313d, local L2 cache 314d, by way of controller 315d. Core 312d is configured to be in operative communication with non-local L3 cache 316b and non-local L4 cache 318 by way of controller 315d. Local L1 cache 313d and local L2 cache 314d may be dedicated to and solely utilized by core 312d. In other words, no other cores may directly utilize local L1 cache 313d and local L2 cache 314d. Controller 315d may be dedicated to and solely utilized by core 312d, local L1 cache 313d, and local L2 cache 314d.

MP computer system 300 further includes exemplary cache pools 378, 380, 382, 384, 386, 388. A "cache pool" is defined herein as a predetermined logical or physical group of one or more caches that is uniquely identified by a bit code contained within a fetch request that is issued by a cache line data requestor.

In an embodiment of the present invention, a cache pool may be a local only cache pool and may consist of only predetermined or identified local or on-board caches. In another embodiment of the present invention, a cache pool may be a hierarchical cache pool and includes one or more non-local caches and all those caches nested there below.

In an implementation, a smallest local only cache pool may be the associated on-board or local cache of the requestor. For example, a local only cache pool 378 includes only the one or more local or on-board caches (i.e., L1 cache 313d and L2 cache 314d) associated with core 312d. The core 312d could identify or otherwise define the cache pool 378 by setting a local only bit as true within its fetch request for a cache line, by setting a bit code that uniquely identifies its local caches within its fetch request for a cache line, or the like.

A larger local only cache pool may be the associated on-board or local caches of requestors within the same processing cluster. For example, a cluster only cache pool 380 includes only the local or on-board caches (i.e., L1 cache 303a, L2 cache 304a, L1 cache 303b, and L2 cache 304b) associated with core 301a and core 301b that are included in the same processing cluster 370. At least one of the cores 301a, 301b could identify or otherwise define the cache pool 380 by setting a cluster local only bit as true within its fetch request for a cache line, by setting a bit code that uniquely identifies the local caches of all the requestors that share the same cluster as the requestor within its fetch request for a cache line, or the like.

A larger local only cache pool may be the associated on-board or local caches of requestors within the same processing drawer. For example, a processing drawer local only cache pool 382 includes only the local or on-board caches (i.e., L1 cache 303a, L2 cache 304a, L1 cache 303b, L2 cache 304b, L1 cache 303c, L2 cache 304c, L1 cache 303d, and L2 cache 304d) associated with all the cores (e.g., 301a, 301b, 301c, and 301d) that are included in the same processing drawer. At least one of the cores could identify or otherwise define the cache pool 382 by setting a processing drawer local only bit as true within its fetch request for a cache line, by setting a bit code that uniquely identifies the local caches of all the requestors that share the same processing drawer as the requestor within its fetch request for a cache line, or the like.

A larger local only cache pool may be the associated on-board or local caches of requestors of the same cluster but also within different processing drawers that may be connected by a peripheral bus, as exemplarily depicted by the bolded connection arrows of FIG. 1. For example, a connected processing drawer local only cache pool 384 includes only the local or on-board caches (i.e., L1 cache 303c, L2 cache 304c, L1 cache 303d, L2 cache 304d, L1 cache 313a, L2 cache 314a, L1 cache 313b, and L2 cache 314b) associated with all the cores (e.g., 302c, 302d, 312a, and 312b) that are included in respective clusters 372, 374 within different processing drawers that are communicatively connected by a peripheral bus, such as a cable. At least one of the cores could identify or otherwise define the cache pool 384 by setting a cable connected cluster local only bit as true within its fetch request for a cache line, by setting a bit code that uniquely identifies the local caches of all the requestors within the same cable connected clusters, but in different processing drawers, as the requestor within its fetch request for a cache line, or the like.

A larger local only cache pool may be the associated on-board or local caches of all requestors of the same MP computer system. For example, a system local only cache pool 385 includes all the local or on-board caches (i.e., all L1 caches and all L2 caches of the MP computer system 300) associated with all the cores (e.g., 302a-302d and 312a-312d) that are included in MP computer system 300. At least one of the cores could identify or otherwise define the cache pool 385 by setting a MP computer system local only bit as true within its fetch request for a cache line, by setting a bit code that uniquely identifies the local caches of all the requestors within the same MP computer system as the requestor within its fetch request for a cache line, or the like.

In an implementation, a L3 hierarchical cache pool may include one L3 cache of the requestor and all nested higher-level caches associated therewith. For example, hierarchical cache pool 386 includes L3 cache 306*b* and L1 cache 303*c*, L2 cache 304*c*, L1 cache 303*d*, and L2 cache 304*d*. At least one of the cores that utilize the L3 cache could identify or otherwise define the L3 hierarchical cache pool 386 by setting a L3 hierarchical cache pool only bit as true within its fetch request for a cache line, by setting a bit code that uniquely identifies the aforementioned caches within its fetch request for a cache line, or the like.

A larger L3 hierarchical cache pool may include two or more L3 caches that are utilized by requestors in the same processing cluster and all nested higher-level caches associated therewith. One of the associated requestors could identify or otherwise define this in cluster L3 hierarchical cache pool by setting a L3 hierarchical cache pool only bit as true within its fetch request for a cache line, by setting a bit code that uniquely identifies the appropriate caches within its fetch request for a cache line, or the like.

A larger L3 hierarchical cache pool may include all L3 caches within the same processing drawer and all nested higher-level caches associated therewith. A requestor could identify or otherwise define this L3 hierarchical cache pool by setting an in drawer L3 hierarchical cache pool only bit as true within its fetch request for a cache line, by setting a bit code that uniquely identifies the appropriate caches within its fetch request for a cache line, or the like.

A larger L3 hierarchical cache pool may be L3 caches of requestors within different processing drawers that may be connected by a peripheral bus. For example, such cache pool may include L3 cache 306*b* and L3 cache 316*a*, and those higher-level caches associated therewith. In other words, caches that are included in respective clusters 372, 374 within different processing drawers that are communicatively connected by a peripheral bus, such as a cable. A requestor could identify or otherwise define this L3 hierarchical cache pool by setting a cabled connected L3 hierarchical cache pool only bit as true within its fetch request for a cache line, by setting a bit code that uniquely identifies the appropriate caches within its fetch request for a cache line, or the like.

A larger L3 hierarchical cache pool may be the L3 caches of each requestor in the same MP computer system 300 and all higher-level caches associated therewith. A requestor could identify or otherwise define this L3 hierarchical cache pool by setting a system L3 hierarchical cache pool only bit as true within its fetch request for a cache line, by setting a bit code that uniquely identifies the appropriate caches within its fetch request for a cache line, or the like.

Similarly, a L4 hierarchical cache pool may include a higher non-local cache of the requestor and all nested higher-level caches associated therewith. For example, hierarchical cache pool 388 includes L4 cache 318, L3 cache 316*a*, L3 cache 316*b*, and all local caches nested there below. At least one of the cores that utilize the L4 cache 318 could identify or otherwise define the L4 hierarchical cache pool 388 by setting a L4 hierarchical cache pool only bit as true within its fetch request for a cache line, by setting a bit code that uniquely identifies the appropriate caches within its fetch request for a cache line, or the like.

For clarity, processing cluster level L4 hierarchical cache pool(s), processing drawer level L4 hierarchical cache pool(s), cable connected processing drawer level L4 hierarchical cache pool(s), system level L4 hierarchical cache pool(s), may be formed and utilized similar to those L3 hierarchical cache pool(s) described above.

For clarity, MP computer system 300 may take several different implementational forms. For example, each processor 301*a*-301*d* and each processor 311*a*-311*d* may be unique CPs. Further, processors 301*a* and 301*b* may be in a processing cluster and processors 301*c*, 301*d* may be in a different processing cluster. In another exemplarity implementation, each processor 301*a*-301*d* may be within the same first CP and each processor 311*a*-311*d* may be within the same second CP.

Figure 5:
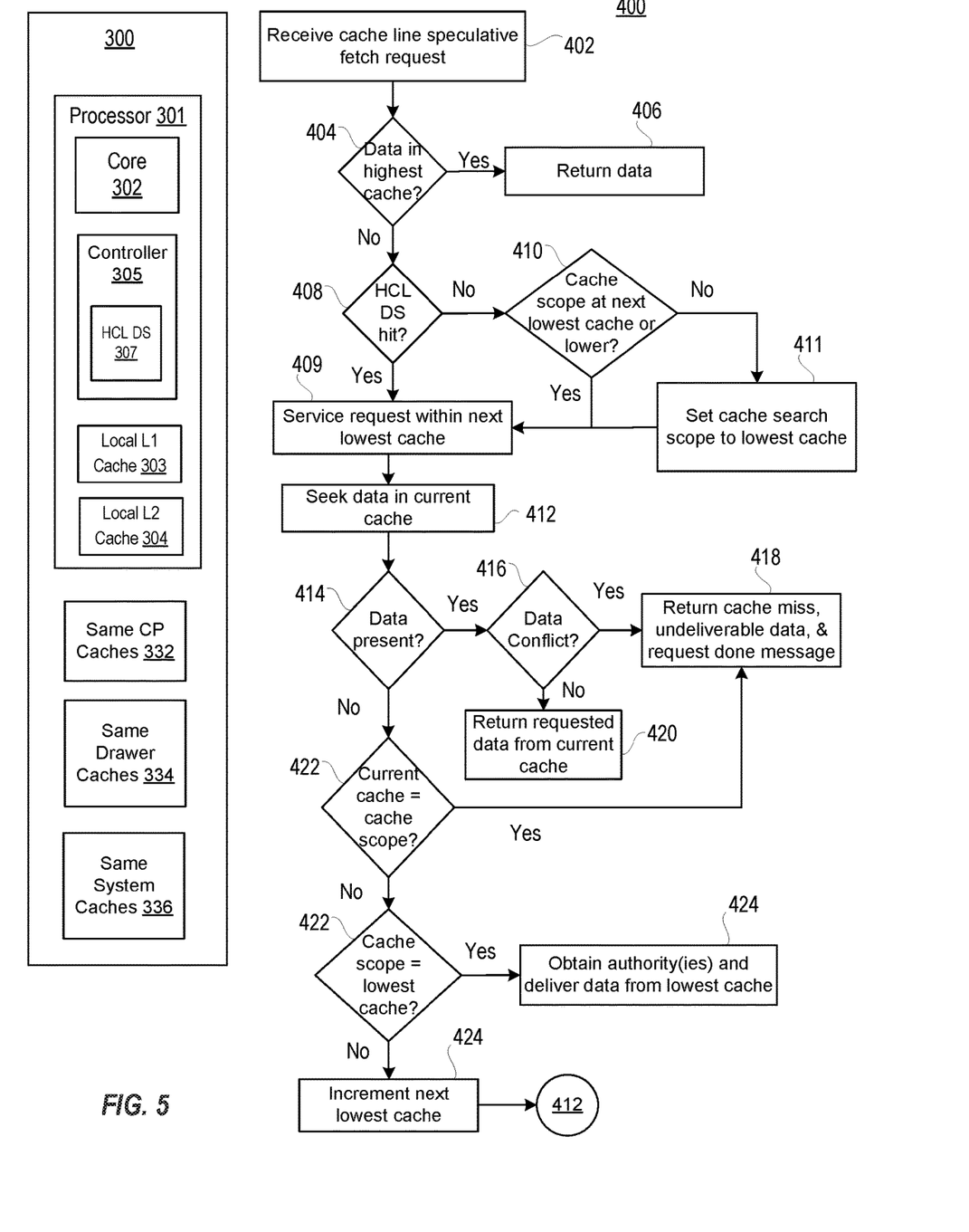
FIG. 5 depicts a flow diagram of a method of fetching data from a cache(s) using a cache scope designation, according to embodiments of the invention.

FIG. 5 depicts a flow diagram of a method 400 of fetching data from a cache(s) using a cache scope designation, according to embodiments of the invention. At block 402, a controller 305 receives a speculative fetch request for cache line data from a requestor, such as a core 302. The speculative fetch request may include space for a cache scope designation, such as a bit, bit code. The cache scope designation generally identifies a cache pool that such requestor is to or may seek such data. The requestor may set the cache scope designation when creating the fetch request. Alternatively, the receiving controller may set the cache scope designation as described below. The fetch request may be speculative in that the requestor is attempting to fetch or obtain such data before a workload needs or otherwise utilizes such data.

The fetch request may further include a fetch command instruction, a request identifier, a cache line data address, and the like. The cache scope designation generally identifies the scope, sets the bounds, etc., of one or more caches in which the controller may seek or otherwise fetch the data there from.

At block 404, the controller 305 determines if the data associated with the speculative fetch request is located within a highest-level cache, such as L1 cache 303 that is local to or on-board with the requestor and returns the data from the L1 cache 303 to the requestor if such data is located therewithin (block 406).

If the data associated with the fetch request is not located within the highest-level cache, method 400 may continue with controller 305 determining whether the data associated with the speculative fetch request is contentious and currently being requested by one or more other requestors. For example, method 400 may continue with controller 305 determining whether the address of the data associated with the speculative fetch request is located within a hot cache line data structure (HCL DS) 307, such as a hot cache line table (block 408). Generally, the scope, boundary, width, range, etc., of the caches tracked by hot cache line data structure 307 is the same or larger than the scope, boundary, width, range etc., of the cache pool group identified by the cache scope designation within the fetch request. For example, a hot cache line data structure 307 may track contentious cache line address across an entire MP computer system while a cache scope designation may specify caches specific to a particular core, particular processing cluster, particular processing drawer, or the like, of that MP computer system.

At block 410, if the address of the data associated with the speculative fetch request is contentious, the controller 305 determines whether the associated cache scope designation is set or otherwise specifies the next lower-level cache or any other lower-level cache (block 410). For example, the controller 305 determines whether the associated cache scope designation is set or otherwise specifies L2 cache 304 or any other lower-level cache relative to L2 cache 304. If the controller 305 determines that no cache pool is specified by the cache scope designation (e.g., the requestor did not specify the cache scope designation), controller 305 sets the cache scope designation to the lowest-level and/or widest-level cache (block 411). For example, controller 305 may set the cache scope designation to identify all caches in the same MP computer system (i.e., same system caches 336) as the requestor. In other words, when there is no cache scope designation or a null cache scope designation within the request from the requestor, the controller 305 may set the cache scope designation at block 411.

At block 409, method 400 may continue from block 411, or may continue if the address of the data associated with the speculative fetch request is not contentious (e.g., it is not within hot cache line data structure 307), by controller 305 servicing the fetch request within the next lower-level cache. For example, controller 305 sends the fetch request to L2 cache 304, attempts to satisfy the fetch request within L2 cache 304, or the like.

At block 412, the controller 305 determines if the data associated with the speculative fetch request is located within the next lower-level cache, e.g., L2 cache 304. If the data associated with the fetch request is located within this cache (block 414), method 400 may continue with controller 305 determining whether the data associated with the fetch request is contentious and the requestor is competing with a different and older request from a different requestor for that data within the same cache (block 416). For example, controller 305 can determine whether the address of the data associated with the speculative fetch request is located within hot cache line data structure 307 and whether such contention entry is associated with the different and older request from the different requestor for that data within the L2 cache 304.

At block 418, if the data associated with the fetch request is located within this cache and if the data associated with the speculative fetch request is contentious and the requestor is competing with the different and older request from the different requestor for that data within the same cache, controller 305 returns a cache miss, undeliverable data, and request done message to the requestor. Upon receipt of such message, the requestor knows or acknowledges that its previous request for the associated data is completed and the resultant search was unsuccessful. As used herein, a search is unsuccessful if the data associated with the fetch request is not stored within the respective cache, such that it cannot be retrieved from that cache as a result of it not being stored within that cache. If such requestor still requires such data, the requestor may issue a new request and may widen the cache scope designation within that new request to allow its controller to seek the data within a larger cache pool.

At block 420, if the data associated with the fetch request is located within this cache and if the data associated with the speculative fetch request is not contentious and the requestor is not competing with any other requestors for that data within the same cache, controller 305 returns the data from this cache. For example, if the data associated with the fetch request is located within L2 cache 304 and is not contentious, controller 305 obtains the data from L2 cache 304 and returns the data to the requestor.

At block 422, it is determined whether the cache that was searched in block 412 is the same as the cache scope designation if the requested data was not located within that cache. If it is determined that the cache that was searched in block 412 is the same as the cache pool specified by the cache scope designation, method 400 returns to block 418.

At block 422, it is determined whether the cache scope designation specifies the lowest-level and/or widest-level cache, such as same system caches 336, if the cache that was searched in block 412 is not the same as the cache pool specified by the cache scope designation.

If the cache scope designation specifies the lowest-level and/or widest-level cache, controller 305 may obtain the requisite authority or authorities over the appropriate cache line associated with the requested data, may obtain the requested data, and may deliver the requested data to the requestor (block 424). For example, controller 305 receives an authority token (from a previous authority, from an authority granting entity, etc.) that grants and/or permits controller 305 to acknowledge or have possession of one or more authorities of cache line associated with the requested data. For example, the authority token may allow or permit controller 305 to use a synchronization mechanism to lock out the other cores from accessing the data until controller 305 releases authority of the cache line. An example of a synchronization mechanism is a mutex. A mutex is a mechanism that operates to enforce limits on access to a resource in a multi-core environment. Therefore, even if two different cores 302 try to fetch the data at the same time, one of the cores 302 will be blocked until the other one releases it. Another synchronization mechanism is a bus arbitrator, which permits only the core that is associated with the controller 305 that has authority to control a bus that obtains, passes, or otherwise handles the data. Although a mutex and bus arbitrator are described, it is to be understood that other synchronization mechanisms may be utilized.

If the cache scope designation does not specify the lowest-level and/or widest-level cache, controller 305 increments or lowers the cache level so as to service the fetch request within the next lower-level cache. For example, in an iteration of method 400 after controller 305 fails in servicing and finding the fetch request in L2 cache 304, controller 305 may increment or lower the cache level to same CP caches 332. Same CP caches may include L3 cache 306a and all higher-level caches associated therewith that have not been searched (e.g., L1 cache 303b and L2 cache 304b) within the same CP as the requestor.

Subsequently, method 400 returns to block 412, where controller 305 attempts to find the data within this next lower-level cache. For example, in this iteration controller 305 may attempt to find the data in same CP caches 332. Seeking of the data within these unsearched caches may be hierarchal starting at the highest-level caches, though other known search techniques are known. For example, L1 cache 303b is initially searched, L2 cache 304b is subsequently searched, and L3 cache 306a is still subsequently searched.

In yet another iteration, if the cache scope designation does not specify the lowest-level and/or widest-level cache, controller 305 may again increment or lower the cache level to service the fetch request within the next lower-level cache. For example, in a next iteration of method 400 after controller 305 fails in servicing and finding the fetch request in CP caches 332, controller 305 may increment or lower the cache level to same processing drawer caches 332. Same processing drawer caches 334 may include L4 cache 308 and all higher caches associated therewith that have not already been searched in the same processing drawer as the requestor.

Subsequently, method 400 returns to block 412, where controller 305 attempts to find the data within this next lower-level cache. For example, in this iteration controller 305 may attempt to find the data in same processing drawer caches 334. Seeking of the data within these unsearched caches may again be hierarchal starting at the highest-level caches working lower until all the unsearched caches have been searched.

In yet another iteration, if the cache scope designation does not specify the lowest-level and/or widest-level cache, controller 305 may again increment or lower the cache level to service the fetch request within the next lower-level cache. For example, in a next iteration of method 400 after controller 305 fails in servicing and finding the fetch request in same processing drawer caches 334, controller 305 may increment or lower the cache level to same MP computing system caches 336. Same MP computing system caches 334 may include all the caches and all higher caches associated therewith that have not already been searched in the same MP computing system as the requestor.

Subsequently, method 400 returns to block 412, where controller 305 attempts to find the data within this next lower-level cache. For example, in this iteration controller 305 may attempt to find the data in same processing drawer caches 334. Seeking of the data within these unsearched caches may again be hierarchal starting at the highest-level caches working lower until all the unsearched caches have been searched.

For clarity, the requestor may initially set the cache scope designation within the fetch request narrowly (e.g., local-only caches local only to the requestor, local-only caches local only to the requestors on the same PC, or the like). Such narrow designation may signal to the receiving cache controller that such request need not necessarily be fulfilled (e.g., the request is of a lower importance, etc.) when the requested data is not within the denoted cache pool and/or when the requested data is contentious.

Alternatively, the requestor may initially set or the controller may set the cache scope designation wide (e.g., local-only caches local to the entire processing drawer, local-only caches local to the entire MP computer system, all L3 caches and those higher-level caches associated therewith, or the like). Such wide designation may signal to the cache controller that such request should be fulfilled (e.g., the request is of a higher importance, etc.) when the requested data is within the cache pool and/or when the requested data is contentious. As such, methodology 400 provides a scheme for a requestor to better manage and/or cause address contention events when the requestor deems such address contention events are requisitely needed. As such, in utilizing such scheme, address contention events, MP performance, latencies, increased executions times, inefficient use of resources, etc. may be diminished.

For clarity, authority of a cache line need not be based on the type or location of a controller, but rather, an authority that is assigned to the control over the associated cache line for each cache line in the system. A controller that holds system level authority of the associated cache line may complete the associated operation and later operate on a different cache line with processing chip level of authority. In these embodiments, therefore, a cache line can have only one designated controller within the entire system that has system level authority thereof, a cache line can have only one designated controller within the same drawer that has processing drawer level authority thereof, a cache line can have only one designated controller within the same processing chip that has processing chip level authority thereof, or the like.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. Various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description but is not intended to be exhaustive or limited to the form disclosed. Many modifications and variations will be apparent to those of ordinary skill in the art without departing from the scope and spirit of the disclosure. The embodiments were chosen and described to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram, or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    receiving, by a cache-controller, a fetch request for data of a cache line from a requestor, the fetch request comprising a cache scope space;
    searching, by the cache-controller, for the data within a high-level cache that is local to the requestor;
    determining, by the cache-controller, a cache scope designation associated with the fetch request;
    determining, by the cache-controller, that the cache scope designation specifies a lower-level cache relative to the high-level cache;
    in response to determining the cache scope designation specifies the lower-level cache, searching, by the cache-controller, for the data within a next-level cache that is at least one cache-level lower from the high-level cache;
    determining, by the cache controller and in response to identifying that the data is not within the next-level cache, whether the next-level cache equals the lower-level cache; and
    transmitting, by the cache-controller and in response to identifying that the next-level cache equals the lower-level cache, a cache-miss message to the requestor.

2. The computer-implemented method of claim 1, wherein the cache-miss message indicates that the fetch request is complete.

3. The computer-implemented method of claim 2, wherein the cache-miss message further indicates that the data is undeliverable to the requestor.

4. The computer-implemented method of claim 1, further comprising:
    performing, by the cache-controller and in response to the data being within the next-level cache, a request conflict check to determine whether a previous request from a previous requestor is seeking the data within the next-level cache; and
    transmitting, by the cache-controller and in response to finding the previous request for the data within the next-level cache, a cache-miss message to the requestor.

5. The computer-implemented method of claim 1, further comprising:
    when the cache scope space comprises a null-set, setting, by the cache-controller, the cache scope designation to a lowest-level cache;
    subsequent to setting the cache scope designation to the lowest-level cache, obtaining, by the cache-controller, authority over the data within the lowest-level cache; and
    returning, by the cache-controller, the data from the lowest-level cache level to the requestor.

6. The computer-implemented method of claim 1, wherein the cache scope designation is set within the cache scope space by the requestor.

7. The computer-implemented method of claim 1, wherein the high-level cache is a level one (L1) cache and wherein the next-level cache is a level two (L2) cache.

8. A system comprising:
    a memory having computer readable instructions; and one or more processors for executing the computer readable instructions, the computer readable instructions controlling the one or more processors to perform operations comprising:
        receiving, by a cache-controller, a fetch request for data of a cache line from a requestor, the fetch request comprising a cache scope space;
        unsuccessfully searching, by the cache-controller, for the data within a high-level cache that is local to the requestor;
        determining, by the cache-controller, a cache scope designation associated with the fetch request;
        determining, by the cache-controller, that the cache scope designation specifies a lower-level cache relative to the high-level cache;
        in response to determining the cache scope designation specifies the lower-level cache, searching, by the cache-controller, for the data within a next-level cache that is at least one cache-level lower from the high-level cache;
        when the data is not within the next-level cache, determining, by the cache-controller, whether the next-level cache equals the lower-level cache; and
        when the next-level cache equals the lower-level cache, transmitting, by the cache-controller, a cache-miss message to the requestor.

9. The system of claim 8, wherein the cache-miss message indicates that the fetch request is complete.

10. The system of claim 9, wherein the cache-miss message further indicates that the data is undeliverable to the requestor.

11. The system of claim 8, further comprising:
    when the data is within the next-level cache, performing, by the cache-controller, a request conflict check to determine whether a previous request from a previous requestor is seeking the data within the next-level cache; and in response to finding the previous request for the data within the next-level cache, transmitting, by the cache-controller, a cache-miss message to the requestor.

12. The system of claim 8, further comprising:

when the cache scope space comprises a null-set, setting, by the cache-controller, the cache scope designation to a lowest-level cache;

subsequent to setting the cache scope designation to the lowest-level cache, obtaining, by the cache-controller, authority over the data within the lowest-level cache; and returning, by the cache-controller, the data from the lowest-level cache level to the requestor.

13. The system of claim 8, wherein the cache scope designation is set within the cache scope space by the requestor.

14. The system of claim 8, wherein the high-level cache is a level one (L1) cache and wherein the next-level cache is a level two (L2) cache.

15. A computer program product comprising a computer readable storage medium having program instructions embodied therewith, the program instructions executable by a processor to cause the processor to perform operations comprising:

receiving, by a cache-controller, a fetch request for data of a cache line from a requestor, the fetch request comprising a cache scope space;

unsuccessfully searching, by the cache-controller, for the data within a high-level cache that is local to the requestor;

determining, by the cache-controller, a cache scope designation associated with the fetch request;

determining, by the cache-controller, that the cache scope designation specifies a lower-level cache relative to the high-level cache;

in response to determining the cache scope designation specifies the lower-level cache, searching, by the cache-controller, for the data within a next-level cache that is at least one cache-level lower from the high-level cache;

when the data is not within the next-level cache, determining, by the cache-controller, whether the next-level cache equals the lower-level cache; and when the next-level cache equals the lower-level cache, transmitting, by the cache-controller, a cache-miss message to the requestor.

16. The computer program product of claim 15, wherein the cache-miss message indicates that the fetch request is complete.

17. The computer program product of claim 16, wherein the cache-miss message further indicates that the data is undeliverable to the requestor.

18. The computer program product of claim 15, further comprising:

when the data is within the next-level cache, performing, by the cache-controller, a request conflict check to determine whether a previous request from a previous requestor is seeking the data within the next-level cache; and in response to finding the previous request for the data within the next-level cache, transmitting, by the cache-controller, a cache-miss message to the requestor.

19. The computer program product of claim 15, further comprising:

when the cache scope space comprises a null-set, setting, by the cache-controller, the cache scope designation to a lowest-level cache;

subsequent to setting the cache scope designation to the lowest-level cache, obtaining, by the cache-controller, authority over the data within the lowest-level cache; and returning, by the cache-controller, the data from the lowest-level cache level to the requestor.

20. The computer program product of claim 15, wherein the cache scope designation is set within the cache scope space by the requestor.

\* \* \* \* \*